United States Patent
Zhang et al.

(10) Patent No.: US 11,954,567 B2
(45) Date of Patent: Apr. 9, 2024

(54) PROBABILITY DISTRIBUTION ASSESSMENT FOR CLASSIFYING SUBTERRANEAN FORMATIONS USING MACHINE LEARNING

(71) Applicant: Landmark Graphics Corporation, Houston, TX (US)

(72) Inventors: Jiazuo Zhang, Reading (GB); Graham Baines, Abingdon (GB)

(73) Assignee: Landmark Graphics Corporation, Houston, TX (US)

( * ) Notice: Subject to any disclaimer, the term of this patent is extended or adjusted under 35 U.S.C. 154(b) by 933 days.

(21) Appl. No.: 16/963,313

(22) PCT Filed: Feb. 20, 2020

(86) PCT No.: PCT/US2020/019062
§ 371 (c)(1),
(2) Date: Jul. 20, 2020

(87) PCT Pub. No.: WO2021/040791
PCT Pub. Date: Mar. 4, 2021

(65) Prior Publication Data
US 2022/0004919 A1    Jan. 6, 2022

Related U.S. Application Data

(60) Provisional application No. 62/891,023, filed on Aug. 23, 2019.

(51) Int. Cl.
*G06F 18/22* (2023.01)
*G01V 20/00* (2024.01)
(Continued)

(52) U.S. Cl.
CPC .............. *G06N 20/00* (2019.01); *G01V 20/00* (2024.01); *G06F 18/214* (2023.01); *G06F 18/22* (2023.01);
(Continued)

(58) Field of Classification Search
None
See application file for complete search history.

(56) References Cited

U.S. PATENT DOCUMENTS 10,354,205 B1    7/2019  Pham et al.
10,565,540 B2 *  2/2020  Webb ................... G06Q 10/067
(Continued)

FOREIGN PATENT DOCUMENTS

KR     20160143512    12/2016
KR     20190086134    7/2019

OTHER PUBLICATIONS

Engle et al. ("Predicting Rare Earth Element Potential in Produced and Geothermal Waters of the United States: Application of Emergent Self-Organizing Maps. Assessing rare earth element concentrations in geothermal and oil and gas produced waters") 2018 (Year: 2018).*

(Continued)

*Primary Examiner* — Roy Y Yi
(74) *Attorney, Agent, or Firm* — Kilpatrick Townsend & Stockton LLP

(57) ABSTRACT

According to some aspects, machine-learning models can be executed to classify a subsurface rock. Examples include training numerous machine-learning models using training data sets with different probability distributions, and then selecting a model to execute on a test data set. The selection of the model may be based on the similarity of each data point of the test data set and the probability distribution of each training class. Examples include detecting and recom- (Continued)

mending a pre-trained model to generate outputs predicting a classification, such as a lithology, of a test data set. Recommending the trained model may be based on calculated prior probabilities that measure the similarity between the training and test data sets. The model with a training data set that is most similar to the test data set can be recommended for classifying a physical property of the subsurface rock for hydrocarbon formation.

20 Claims, 8 Drawing Sheets

(51) Int. Cl.
*G06F 18/214* (2023.01)
*G06F 18/2431* (2023.01)
*G06N 20/00* (2019.01)

(52) U.S. Cl.
CPC ...... *G06F 18/2431* (2023.01); *G01V 2210/66* (2013.01)

(56) References Cited

U.S. PATENT DOCUMENTS

2010/0063948 A1 3/2010 Virkar et al.
2016/0132787 A1 5/2016 Drevo et al.

OTHER PUBLICATIONS

CGG, "Powerlog: Industry-Leading Petrophysical Interpretation", available online at https://www.cgg.com/en/What-We-Do/GeoSoftware/Solutions/PowerLog at least as early as Jul. 23, 2019, 1 page.

CGG, "Powerlog; Petrophysics", available online at https://www.cgg.com/en/What-We-Do/GeoSoftware/Petrophysics/Powerlog at least as early as Jul. 23, 2019, 6 pages.

Du Plessis et al., "Semi-supervised learning of class balance under class-prior change by distribution matching", Neural Networks, vol. 50, https://doi.org/10.1016/j.neunet.2013.11.010, 2014, pp. 110-119.

International Application No. PCT/US2020/019062, "International Search Report and Written Opinion", Jun. 12, 2020, 10 pages.

Raza et al., "EWMA Based Two-Stage Dataset Shift-Detection in Non-stationary Environments", IFIP International Conference on Artificial Intelligence Applications and Innovations, 2013, 12 pages.

* cited by examiner

Table of values of $X^2$ in a Chi-Squared Distribution with $k$ degrees of freedom such that $p$ is the area between $X^2$ and $+\infty$

| k | 0.995 | 0.99 | 0.975 | 0.95 | 0.9 | 0.75 | 0.5 | 0.25 | 0.1 | 0.05 | 0.025 | 0.01 | 0.005 | 0.002 | 0.001 |
|---|---|---|---|---|---|---|---|---|---|---|---|---|---|---|---|
| 1 | 3.927e-5 | 1.570e-4 | 9.820e-4 | 0.00393 | 0.0157 | 0.102 | 0.455 | 1.323 | 2.706 | 3.841 | 5.024 | 6.635 | 7.879 | 9.550 | 10.828 |
| 2 | 0.0100 | 0.0201 | 0.0506 | 0.103 | 0.211 | 0.575 | 1.386 | 2.773 | 4.605 | 5.991 | 7.378 | 9.210 | 10.597 | 12.429 | 13.816 |
| 3 | 0.0717 | 0.115 | 0.216 | 0.352 | 0.584 | 1.213 | 2.366 | 4.108 | 6.251 | 7.815 | 9.348 | 11.345 | 12.838 | 14.796 | 16.266 |
| 4 | 0.207 | 0.297 | 0.484 | 0.711 | 1.064 | 1.923 | 3.357 | 5.385 | 7.779 | 9.488 | 11.143 | 13.277 | 14.860 | 16.924 | 18.467 |
| 5 | 0.412 | 0.554 | 0.831 | 1.145 | 1.610 | 2.675 | 4.351 | 6.626 | 9.236 | 11.070 | 12.833 | 15.086 | 16.750 | 18.907 | 20.515 |
| 6 | 0.676 | 0.872 | 1.237 | 1.635 | 2.204 | 3.455 | 5.348 | 7.841 | 10.645 | 12.592 | 14.449 | 16.812 | 18.548 | 20.791 | 22.458 |
| 7 | 0.989 | 1.239 | 1.690 | 2.167 | 2.833 | 4.255 | 6.346 | 9.037 | 12.017 | 14.067 | 16.013 | 18.475 | 20.278 | 22.601 | 24.322 |
| 8 | 1.344 | 1.646 | 2.180 | 2.733 | 3.490 | 5.071 | 7.344 | 10.219 | 13.362 | 15.507 | 17.535 | 20.090 | 21.955 | 24.352 | 26.124 |
| 9 | 1.735 | 2.088 | 2.700 | 3.325 | 4.168 | 5.899 | 8.343 | 11.389 | 14.684 | 16.919 | 19.023 | 21.666 | 23.589 | 26.056 | 27.877 |
| 10 | 2.156 | 2.558 | 3.247 | 3.940 | 4.865 | 6.737 | 9.342 | 12.549 | 15.987 | 18.307 | 20.483 | 23.209 | 25.188 | 27.722 | 29.588 |
| 11 | 2.603 | 3.053 | 3.816 | 4.575 | 5.578 | 7.584 | 10.341 | 13.701 | 17.275 | 19.675 | 21.920 | 24.725 | 26.757 | 29.354 | 31.264 |
| 12 | 3.074 | 3.571 | 4.404 | 5.226 | 6.304 | 8.438 | 11.340 | 14.845 | 18.549 | 21.026 | 23.337 | 26.217 | 28.300 | 30.957 | 32.909 |
| 13 | 3.565 | 4.107 | 5.009 | 5.892 | 7.042 | 9.299 | 12.340 | 15.984 | 19.812 | 22.362 | 24.736 | 27.688 | 29.819 | 32.535 | 34.528 |
| 14 | 4.075 | 4.660 | 5.629 | 6.571 | 7.790 | 10.165 | 13.339 | 17.117 | 21.064 | 23.685 | 26.119 | 29.141 | 31.319 | 34.091 | 36.123 |
| 15 | 4.601 | 5.229 | 6.262 | 7.261 | 8.547 | 11.037 | 14.339 | 18.245 | 22.307 | 24.996 | 27.488 | 30.578 | 32.801 | 35.628 | 37.697 |
| 16 | 5.142 | 5.812 | 6.908 | 7.962 | 9.312 | 11.912 | 15.338 | 19.369 | 23.542 | 26.296 | 28.845 | 32.000 | 34.267 | 37.146 | 39.252 |
| 17 | 5.697 | 6.408 | 7.564 | 8.672 | 10.085 | 12.792 | 16.338 | 20.489 | 24.769 | 27.587 | 30.191 | 33.409 | 35.718 | 38.648 | 40.790 |

PROBABILITY DISTRIBUTION ASSESSMENT FOR CLASSIFYING SUBTERRANEAN FORMATIONS USING MACHINE LEARNING

TECHNICAL FIELD

The present disclosure relates generally to analyzing a subterranean formation for supporting hydrocarbon exploration. More specifically, but not by way of limitation, this disclosure relates to generating an output recommending a trained machine-learning model to select for classifying features of a subterranean formation, such as a lithology.

BACKGROUND

Hydrocarbon exploration is the search for hydrocarbons within a subterranean formation. The search for hydrocarbons relies heavily on the chemical and physical properties of subsurface formations. Geological and geophysical properties of a subsurface formation can be measured and interpreted to classify the subsurface formation by, for example, lithology, rock type, or rock facies. The properties of subsurface formations, however, can vary significantly across different geographical regions. When the properties of a subsurface formation that has yet to be classified are not similar to the properties of previously classified subsurface formations, then the resulting classification of the subsurface formation can be inaccurate. Inaccurate classifications can lead to poor hydrocarbon production.

DETAILED DESCRIPTION

Figure 1:
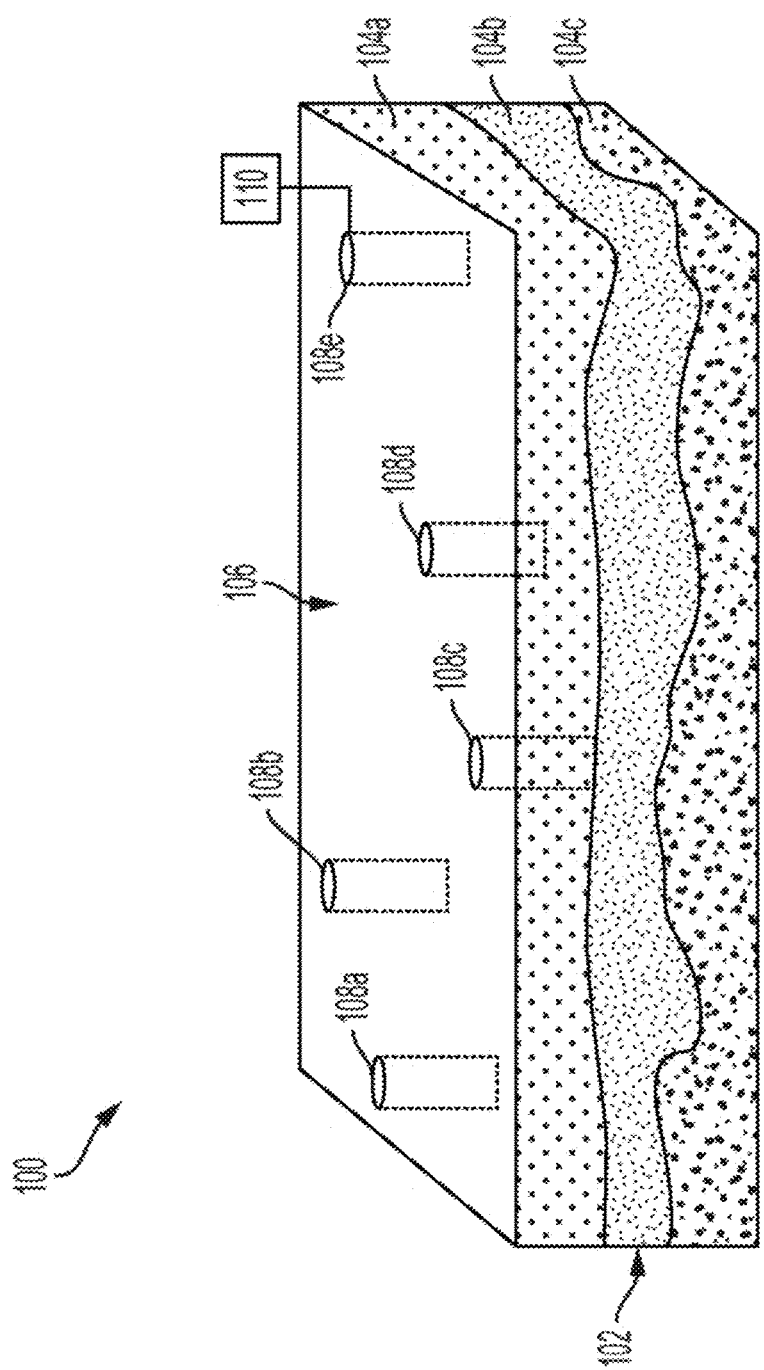
FIG. 1 is an example of a subterranean formation used to collect training or test data sets, according to some aspects of the present disclosure.

Certain aspects and features of the present disclosure relate to classifying subterranean formations using machine-learning models. Subterranean formations can be classified to inform hydrocarbon exploration or production. The classification can be based on physical properties of subsurface rock, such as lithology, rock type, rock facies, rock color, and rock texture. Measurements collected from a subterranean formation can be inputted into a machine-learning model to classify the subsurface rock. A machine-learning model used for classifying subterranean formations may be trained using a training data set. Training data sets may include geological or geophysical measurements collected from various geographical regions with subterranean formations made of different rock types. The measurements included in a training data set, however, may have a different probability distribution than the measurements of the subterranean formation yet to be classified. The difference in probability distribution may be due to the different physical properties associated with the subterranean formations. When the probability distribution of the training data set is not similar to the probability distribution of the test data set (e.g., the geological data being classified), however, the classification, such as a lithology, may be inaccurate. Inaccurate classifications can lead to poor hydrocarbon production.

Machine-learning models can be trained using training data sets with different probability distributions, and then a machine-learning model can be selected to execute on a test data set. The machine-learning model can be selected based on the similarity of the probability distributions between the training and test data sets. The selected trained machine-learning model can be recommended to generate outputs predictive of the classification (e.g., lithology) of a test data set. Recommending the trained machine-learning model may be based on calculated prior probabilities that determine a similarity metric between the training and test data sets. The machine-learning model with a training data set that is most similar to the test data set can be recommended for evaluating the test data set to generate a prediction of the lithology of the subterranean formation being examined.

In some examples, the lithology classification of a subterranean formation may be used for hydrocarbon exploration. As an illustrative example, measurements of a subterranean formation (e.g., wireline logging measurements) can be inputted into the trained machine-learning model to generate a prediction of sandstone. Sandstone is a reservoir rock, which can store hydrocarbon fluid. The location of deposits of hydrocarbon fluids can be estimated using the lithology classification and a plan to drill a wellbore to extract the hydrocarbon fluids may be determined. Lithology classifications are an illustrative example, and thus, other classifications of the measurements can be predicted, such as rock type and rock facies.

Some examples of the present disclosure include calculating the similarity between the training and test data sets as prior probabilities before generating predictions and recommending the a trained machine-learning model for generating lithology predictions. Probability distributions of features for each class in a training data set (e.g., using a mean and covariance matrix) can be characterized and stored. The similarity of each test data point to each training class can be calculated. The quality of prediction for each test data point can be assessed using the maximum similarity. The suitability of a trained model to generate predictions across the entire test data set can be assessed using the calculated similarities.

A system according to some examples can apply a statistical method to calculate similarities between the training and test data sets for multiple trained machine-learning models to automatically recommend the most suitable model for lithology predictions. Some examples of the system may include calculating prior probabilities by comparing class-wise input probability distributions rather than global distributions. Calculating distance or confidence values of a test data set to each training class may avoid the complexity of reproducing and comparing global distributions of training and test data sets. In the field of geoscience, multi-class classification problems may be imbalanced with discontinuous probability distributions between classes. Additionally, a system according to some examples can increase memory efficiency in production as a few statistical parameters of the training data set may be stored and accessed rather than the entire training data set, which is beneficial when training with very large data sets.

A supervised machine-learning application according to some examples may include two stages: a first stage that involves training with human-interpreted or computer-interpreted labels to train a model to learn patterns within the data and rules between data sets and labels; and a second stage that involves generating predictions to assign labels to a test data set using the relationships learned during training. To compare the class-wise probability distributions of the training and test data sets directly before predicting labels on the test data set, a system according to some examples may estimate the prior probability that describes the similarity of a data point of the test data set to each training class. Further, the system may generate an output representing a recommendation of a trained machine-learning model to select for evaluating the test data set.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional side view of subterranean formation 100 according to some aspects of the present disclosure. The subterranean formation 100 may include an underground region 102 and a surface region 106. The underground region 102 may be formed of various strata 104a-c that include different materials (e.g., rock, soil, oil, water, or gas) and vary in thickness and shape. Wells 108a-e may be installed to collect data, such as geological or geophysical measurements (e.g., wireline logging measurements) from the subterranean formation 100.

Wells 108a-e and any sensors may be connected to a computing device 110. The computing device 110 can be positioned at the surface of wells 108a-e or elsewhere (e.g., offsite). The computing device 110 may be in communication with the drill strings, sensors, or other electronic devices used for hydrocarbon exploration or extraction. For example, the computing device 110 can be configured with a communication interface for transmitting information to and receiving information from another communication interface of a drilling subsystem. In some examples, the computing device 110 can receive information from downhole (or elsewhere) in substantially real time, which can be referred to as real-time data. The geological data may include measurements of physical characteristics detected within each well of wells 108a-e. In some examples, each well of wells 108a-e may be characterized by a well log. The geological data (e.g., geophysical measurements) collected from wells 108a-e can be evaluated and classified by a user (e.g., a geologist). For example, classifying the geological data may include labeling portions of the geological data with a lithology (e.g., rock type). Labeling geological data may include appending a tag (e.g., an alphanumeric code) representing the classification to a data item or to a data set. A training data set may include labeled geological data that has already been classified by a user. Multiple training data sets may include labeled geological data from different geographical regions or exhibiting different physical characteristics. The computing device 110 can display (using display device 226) the subterranean formation 100 as a two-dimensional (2D) or three-dimensional (3D) figure.

Figure 2:
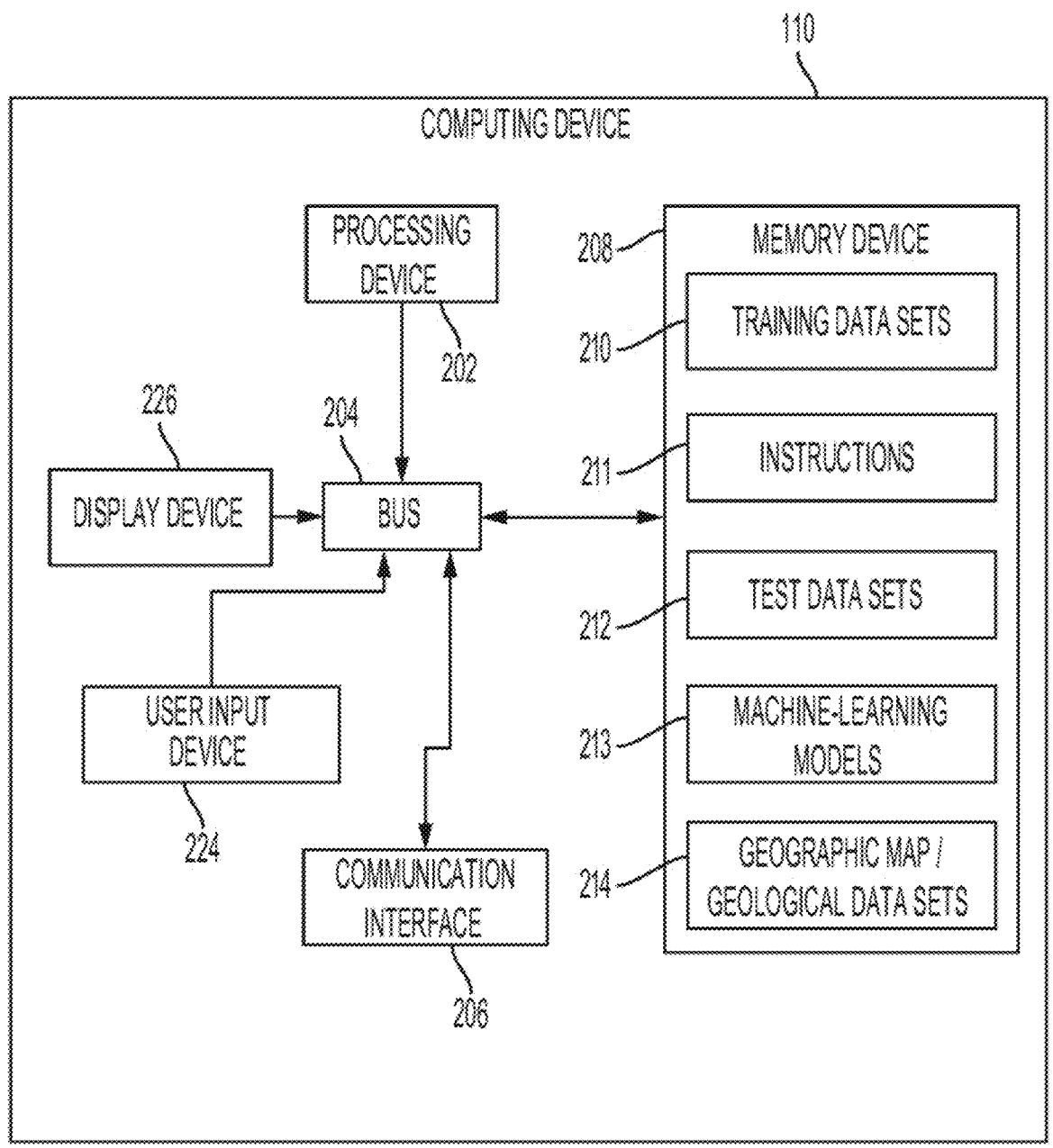
FIG. 2 is a block diagram illustrating a computing device for analyzing data of a subterranean formation, according to some aspects of the present disclosure.

FIG. 2 depicts an example of a computing device 110, according to some aspects of the present disclosure. The computing device 110 can include a processing device 202, a bus 204, a communication interface 206, a non-transitory or non-volatile memory device 208, a user input device 224, and a display device 226. In some examples, one or more of the components shown in FIG. 2 can be integrated into a single structure, such as a single housing. In other examples, one or more of the components shown in FIG. 2 can be distributed (e.g., in separate housings or in separate locations) and in wired or wireless communication with each other.

The processing device 202 can execute one or more operations for generating a prediction of a lithology of a subterranean formation. The processing device 202 can execute instructions 211 stored in the memory device 208 that are executable by the processing device 202 to perform the operations. The processing device 202 can include one processing device or multiple processing devices. Non-limiting examples of the processing device 202 include a Field-Programmable Gate Array ("FPGA"), an application-specific integrated circuit ("ASIC"), a microprocessing device, etc.

The processing device 202 can be communicatively coupled to the memory device 208 via the bus 204. The non-volatile memory device 208 may include any type of memory device that retains stored information when powered off. Non-limiting examples of the memory device 208 include electrically erasable and programmable read-only memory ("EEPROM"), flash memory, or any other type of non-volatile memory. In some examples, at least some of the memory device 208 can include a non-transitory medium from which the processing device 202 can read instructions. A non-transitory computer-readable medium can include electronic, optical, magnetic, or other storage devices capable of providing the processing device 202 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C #, etc.

In some examples, the memory device 208 can include training data sets 210, collected from well logs of wells drilled in various subterranean formations. Training data sets may be collected from different subterranean formations, and thus, the training data sets may include geological data of different rock types. The geological data of a training data set may have a different probability distribution than the geological data of another training data set if the two training data sets were collected from different geographical regions.

In some examples, each training data set may be labeled with a lithology after being interpreted by a user or a computer. The memory device 208 can also include test data sets 212, collected from a subterranean formation. A test data set may include geological data that has not yet been classified with a lithology. A test data set may include measurements of physical characteristics collected from a subterranean formation. The memory device 208 can store machine-learning models 213 and a stored geographic map 214. Machine-learning models 213 may store any machine-learning model, including unsupervised, semi-supervised, and supervised models.

In some examples, the computing device 110 includes a communication interface 206. The communication interface 206 can represent one or more components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

In some examples, the computing device 110 includes a user input device 224. The user input device 224 can represent one or more components used to input data. Examples of the user input device 224 can include a keyboard, mouse, touchpad, button, or touch-screen display, etc.

In some examples, the computing device 110 includes a display device 226, which can render and display an interface that enables users to generate recommendations of machine-learning models and other information used in the process described herein. The display device 226 can represent one or more components used to output data. Examples of the display device 226 can include a liquid-crystal display (LCD), a television, a computer monitor, a touch-screen display, etc. In some examples, the user input device 224 and the display device 226 can be a single device, such as a touch-screen display.

Figure 3:
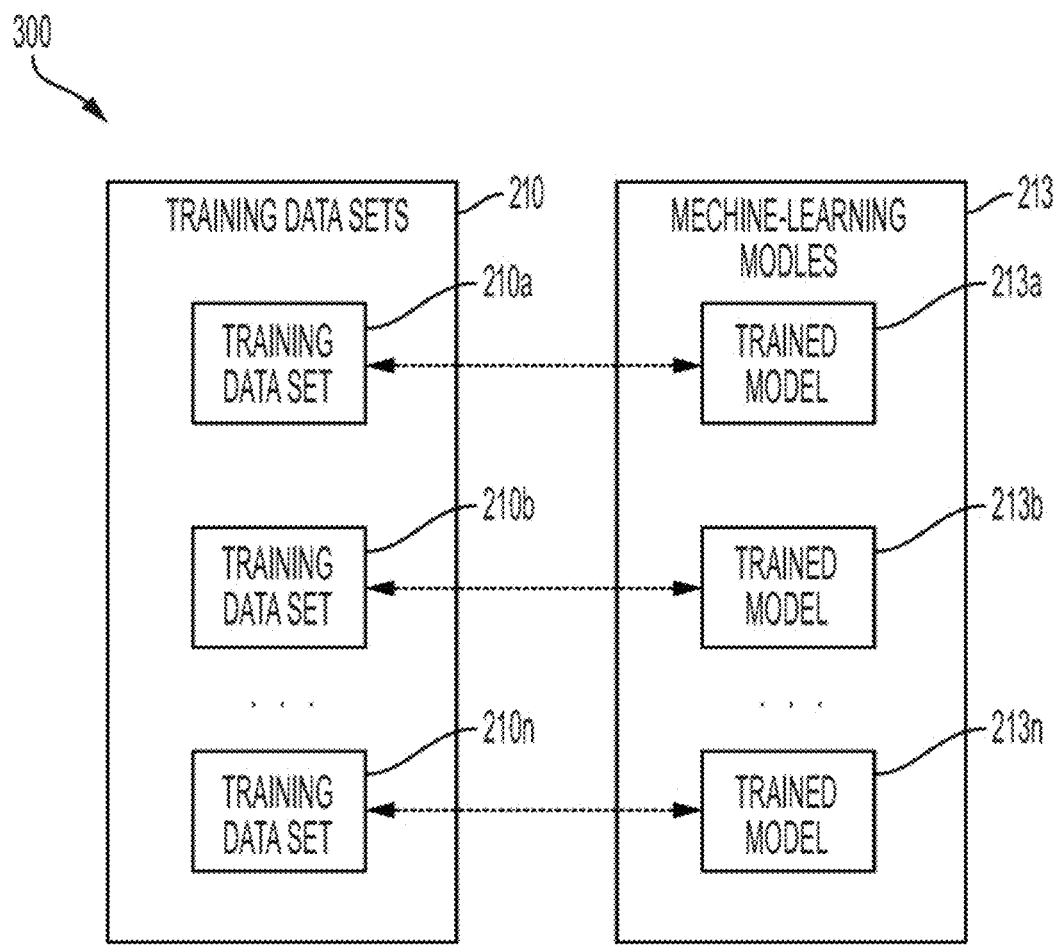
FIG. 3 is a block diagram illustrating an example of a network environment configured to store training data sets, statistical metrics of the training data sets, and machine-learning models, according to some aspects of the present disclosure.

FIG. 3 is a block diagram illustrating an example of a network environment 300 configured to store training data sets and machine-learning models, according to some aspects. Training data sets 210 may store training data sets 210a-n. Training data sets 210a-n may include geological data from various geological regions. Each training data set of training data sets 210a-n may include labeled geological data. For example, each training data set may have been interpreted and classified by a computer or by a user (e.g., a geologist). Each training data set may include one or more classifications because portions of the geological data within a single subterranean formation may correspond to several different rock types. Each classification may be a set of labeled geological data within a training data set and may be referred to as a training class.

Machine-learning models 213 may store machine-learning models 213a-n. Each machine-learning model may be a model created using one or more unsupervised (e.g., clustering), semi-supervised (e.g., generative or ensemble models), or supervised (e.g., linear regression, Support Vector Machines) machine-learning algorithms. Each of machine-learning models 213a-n may be trained using a training data set. As an illustrative example, machine-learning model 213a may have been trained using training data set 210a, machine-learning model 213b may have been trained using training data set 210b, and machine-learning model 213n may have been trained using training data set 210n.

Figure 4:
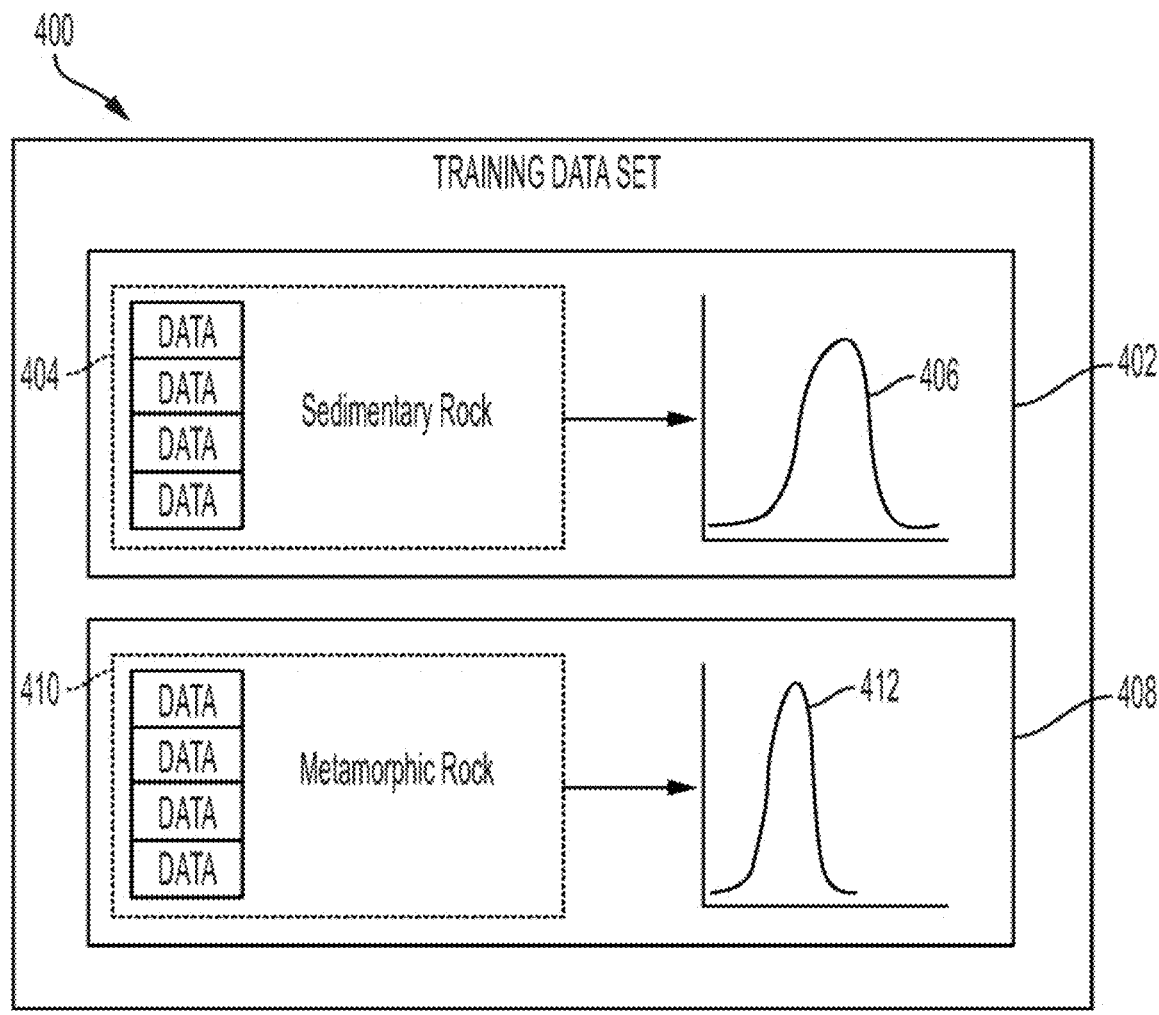
FIG. 4 is a diagram illustrating an example of a training data set with multiple training classes, according to some aspects of the present disclosure.

FIG. 4 is a diagram illustrating an example of a training data set 400 with multiple training classes, according to some aspects. The training data set 400 may be a geological data set collected from a subterranean formation. As an illustrative example, the training data set 400 may include a plurality of training classes, including training class 402 and training class 408. Each training class 402 and 408 may include a portion of the geological data set of the training data set 400. Training class 402 may include a portion of geological data 404 that has been labeled with a lithology classification. For example, training class 402 may have been classified by a geologist as sedimentary rock. Training class 408 may also include a different portion of geological data 410 that has been labeled with a lithology classification. For example, training class 408 may have been classified as metamorphic rock. Lithology classification may be performed automatically by a processor or manually by a user, such as a geologist.

The portion of geological data 404 that represent training class 402 may exhibit a probability distribution 406. The portion of geological data 410 that represents training class 408 may exhibit a probability distribution 412. The probability distributions 406 and 412 may be different from each other due to the difference in the physical characteristics of the portions of the geological data. During training, computing device 110 may calculate and store probability distributions of features (e.g., wireline logs) for each training class (e.g., interpreted lithology) in a training data set. For example, the probability distribution of the geological data within a training class may be calculated using a mean and covariance matrix. The probability distribution of each training class may be compared against the probability distribution of the test data set to identify which training class(es) are similar to the test data set.

Figure 5:
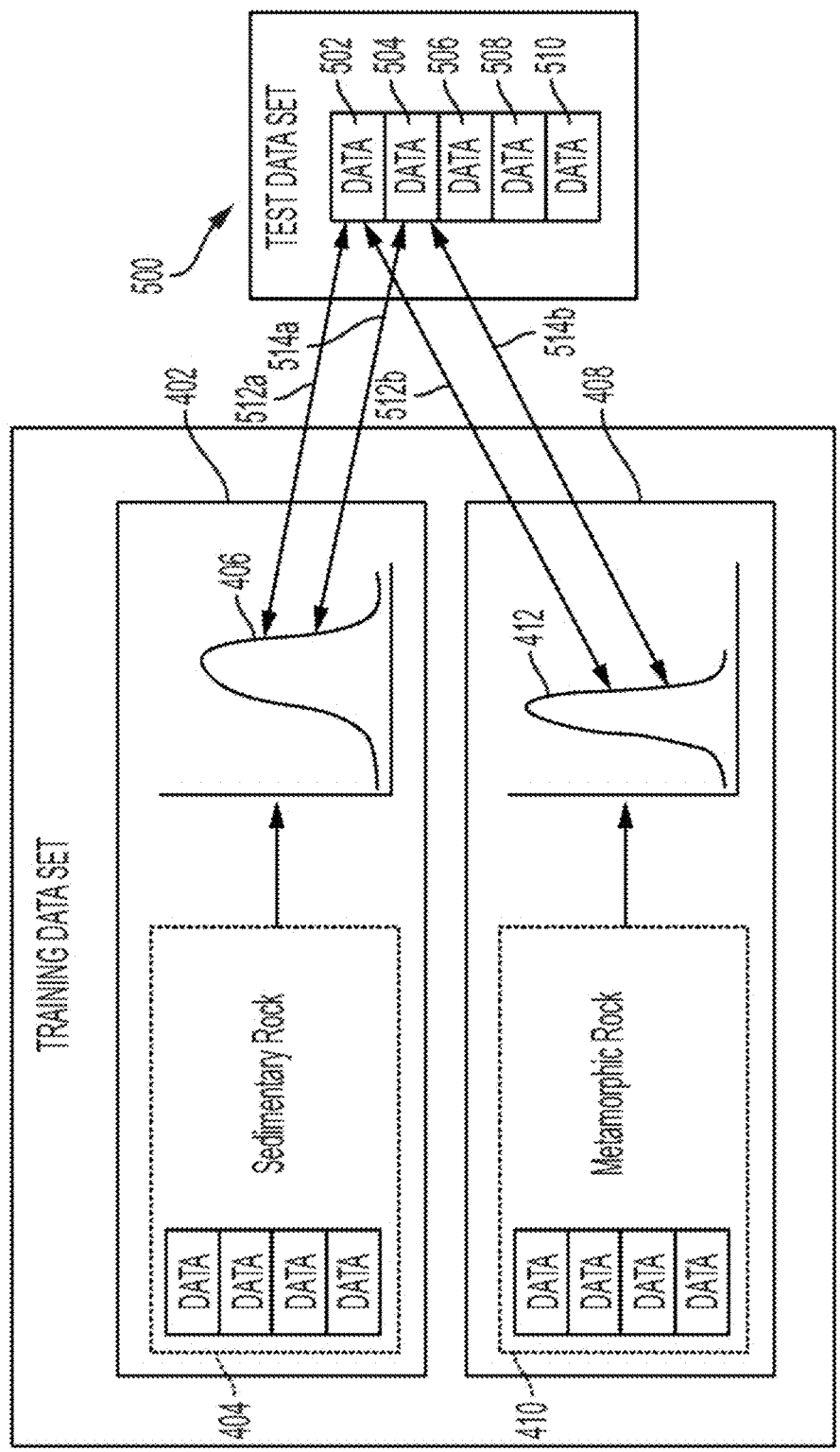
FIG. 5 is a diagram illustrating an example of comparing test data points of a test data set with the probability distribution of a training class of a training data set, according to some aspects of the present disclosure.

FIG. 5 is a diagram illustrating an example of comparing the probability distribution of a test data set 500 with the probability distribution of each training class of the training data set 400 from FIG. 4, according to some aspects. Test data set 500 may include data points 502-510. The test data set 500 may be collected from a subterranean formation for which the lithology has not yet been classified.

In some implementations, the computing device 110 may calculate a distance between each data point 502-510 and the probability distribution of each training class. As an illustrative example, the computing device 110 may calculate the class-wise Mahalanobis distances of each test data point 502-510 to individual training class distributions. The Mahalanobis distance may be calculated using the equation below:

$$D_M(\bar{x})^C = (\bar{x} - \bar{\mu}_c)^T \Sigma_c^{-1} (\bar{x} - \bar{\mu}_c) \quad \text{(Equation 1)}$$

In Equation 1, $\bar{\mu}_c$ may represent the mean. $\Sigma c$ may represent the covariance matrix of the multi-dimensional class-wise training data distributions. $\bar{x}$ may be a series of test data points with the same dimensionality that is assumed from the same distribution with the covariance matrix. $D(\bar{x})C$ may represent the calculated Mahalanobis distance for that test data point to each training class (e.g., subscript M may denote Mahalanobis, and superscript C may denote training classes).

Figure 6:
FIG. 6 is a chart illustrating an example of multivariate probability distributions with k degrees of freedom, according to some aspects of the present disclosure.

In some examples, the smallest calculated distance between a test data point and the probability distribution of each training class may be retained and mapped to the Chi-Squared Distribution with k degrees of freedom (as shown in table 600 of FIG. 6). In table 600 of FIG. 6, k may represent the dimension of the training and test data sets. The chi-squared probability may represent the highest confidence level at which the test data point may belong to a class in the training data set 400. The calculated confidence level may be referred to as the prior probability. The prior probabilities may be evaluated to determine which trained model to select for generating predictions across the entire test data set 500. In some examples, warnings can be displayed for intervals with very low prior probability (e.g., lower than a predefined threshold) to guide users to data for which predictions may be of lower quality and require further investigation.

As an illustrative example of the comparisons illustrated in FIG. 5, the computing device 110 can calculate the probability distribution for each training class 402 and 408 to yield probability distributions 406 and 412, respectively. The computing device 110 may then calculate a similarity between each test data point 502-510 against probability distribution 406 and 412 individually. For example, at step 512a, the computing device 110 may calculate the distance (e.g., the Mahalanobis distance) between the test data point 502 and the probability distribution 406 of the training class 402. At step 512b, the computing device may calculate the distance between the test data point 502 and the probability distribution 412 of the training class 408. Additionally, at step 514a, the computing device may calculate the distance between the test data point 504 and the probability distribution 406 of the training class 402. At step 514b, the computing device may calculate the distance between the test data point 504 and the probability distribution 412 of the training class 408. The distance calculations (e.g., using Equation 1) may be performed for each training class in each training data set. The computing device 110 may select a training data set based on a result of the distance calculations (e.g., which indicate a similarity between the test data set and each training data set). For example, the training data set for which the distance between a data point and the probability distribution of a training class is the shortest may be selected. The trained machine-learning model corresponding to the selected training data set may be used to evaluate the test data set 500 to generate an output predictive of the lithology of the test data set 500.

Figure 7:
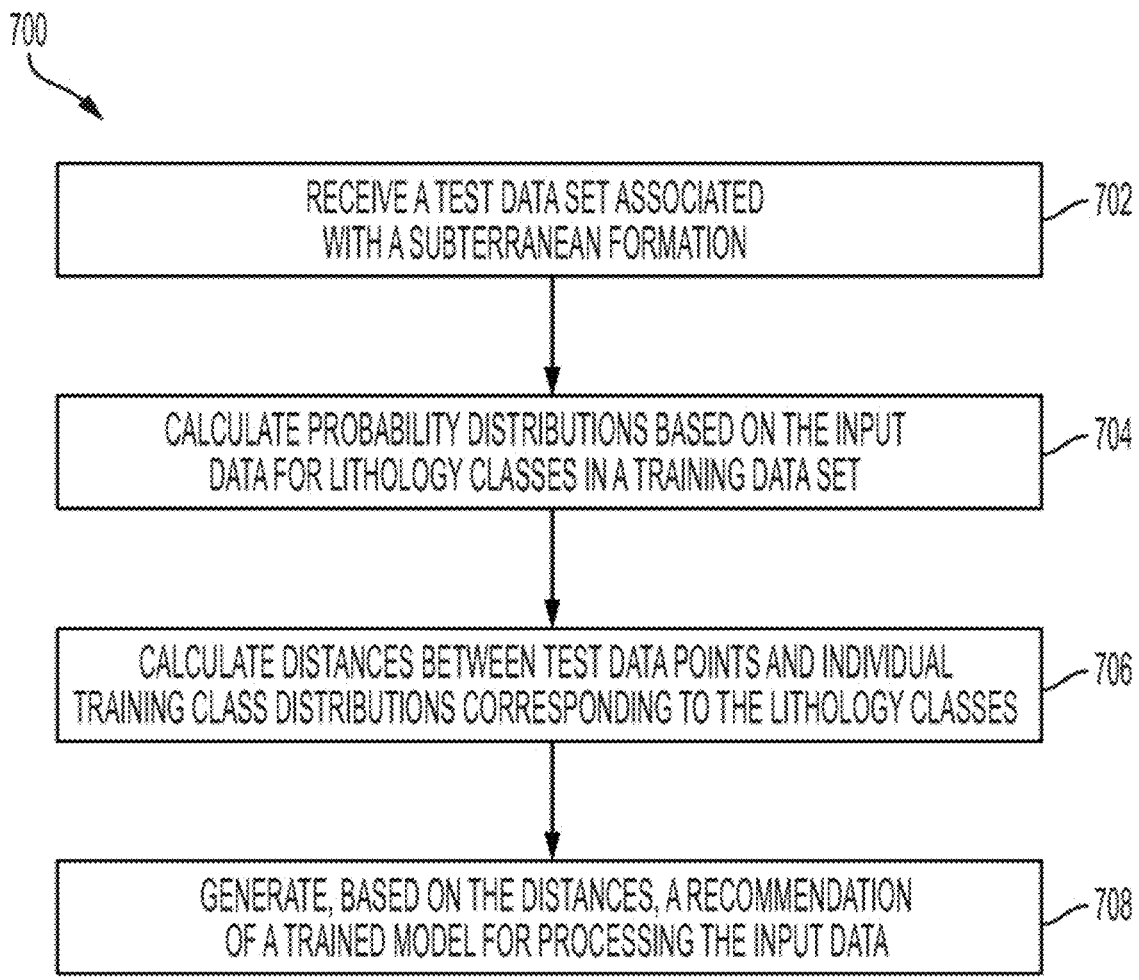
FIG. 7 is a flowchart illustrating an example of a process for generating a recommendation of a machine-learning model to use for classifying geological or geophysical data, according to some aspects of the present disclosure.

FIG. 7 is a flowchart illustrating an example of a process 700 for generating a recommendation of a machine-learning model to process geological data, according to some aspects. Process 700 may be performed by computing device 110. Further, process 700 may be performed to select a training data set with a similar probability distribution as a test data set and generate a recommendation of a machine-learning model to use for classifying the test data set.

Process 700 may begin with block 702, where, for example, the computing device 110 may receive a test data set collected from a subterranean formation. For example, the test data set may include geological data representing physical characteristics of the subterranean formation. The lithology of the test data set may not yet be classified. At block 704, the computing device 110 may calculate a probability distribution for each training class of each training data set of a plurality of training data sets. A training data set may include one or more training classes. For example, each training class may include a portion of the geological data of the training data set.

At block 706, the computing device 110 may calculate the distances between each test data point of the test data set and the probability distribution of each training class. For example, the computing device 110 may use Equation 1 above to calculate the distances at block 706.

At block 708, the computing device 110 may generate a recommendation of a machine-learning model based on the distances calculated at block 706. The smallest calculated distance between a test data point and the probability distribution of each training class may be retained and mapped to a Chi-Squared Distribution with k degrees of freedom. The chi-squared probability may represent the highest confidence level at which the test data point may belong to a class in the training data set 400. The prior probabilities may be evaluated to determine which trained model to select for generating predictions across the entire test data set 500. The model selected for the recommendation may be the model that corresponds to the selected training data set that has a probability distribution similar to the test data set. In some examples, the model recommendation may be outputted to an interface, as described with respect to FIG. 8 below.

Figure 8:
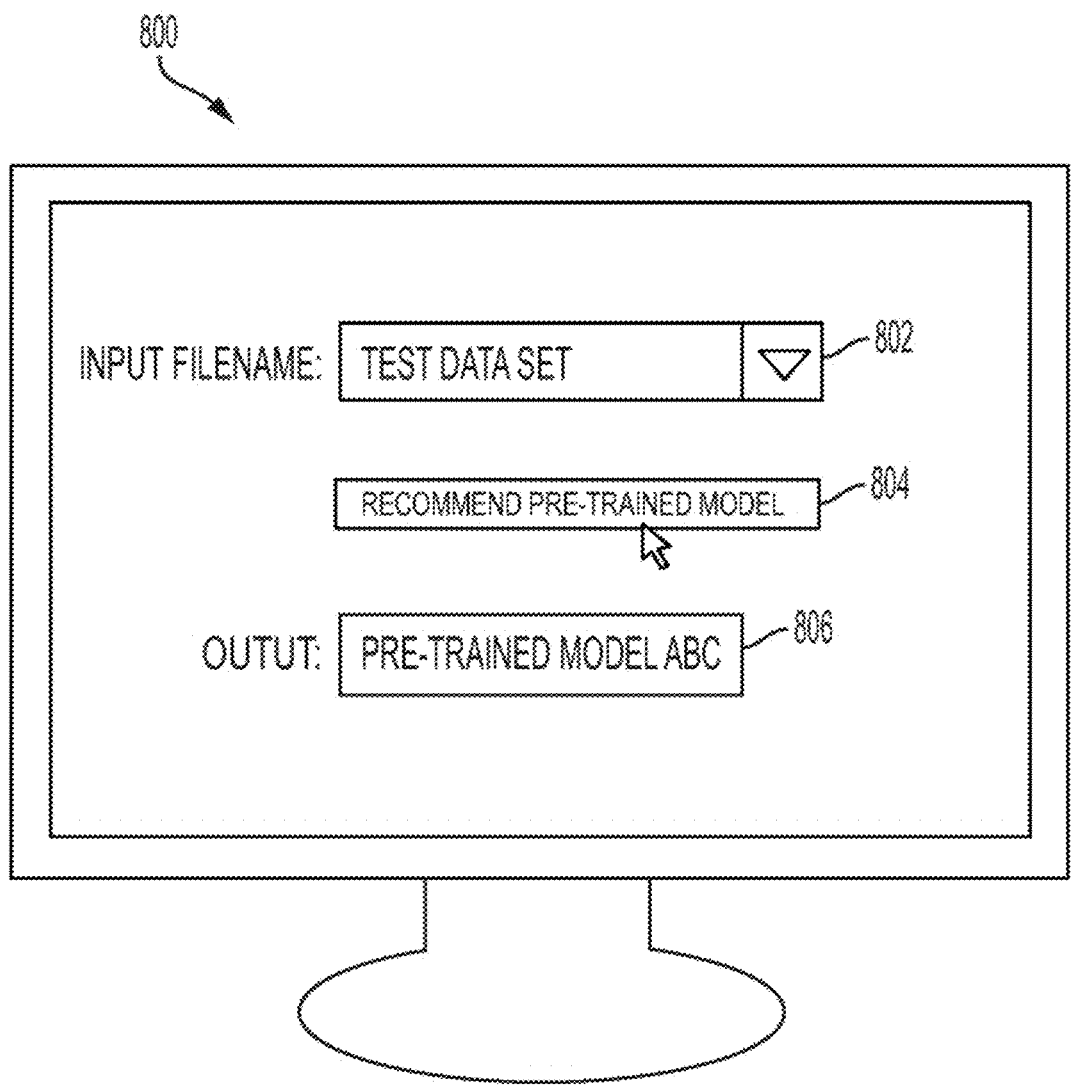
FIG. 8 is an interface displaying an example of an output of a computing device, according to some aspects of the present disclosure.

FIG. 8 is an interface 800 displaying an example of an output of the computing device 110, according to some aspects. The interface 800 may include a screen that is displayed as part of running an application on the computing device 110. The application may enable a user to generate a recommendation of a pre-trained model to use in classifying the lithology of geological data. As an illustrative example, the interface 800 may display input element 802 for selecting a test data set to be the subject of lithology classification. Selecting input element 802 with a cursor may enable a user to identify a file or a network location at which the test data set may be stored. The interface 800 may also display a button 804. Button 804 may be selectable. Selecting button 804 may cause the application to execute code that performs the processes described herein (e.g., process 700). For example, selecting button 804 may cause the computing device 110 to calculate distances between each test data point and the probability distribution of each training class of each training data set. The result of the comparison may be used to determine which pre-trained machine-learning model to select for performing the lithology classification of the training data set. The selected pre-trained model may be displayed in element 806 of the interface 800. As illustrated in FIG. 8, the interface 800 may display that the recommended model for classifying the test data set is "Pre-Trained Model ABC." In some examples, the interface 800 may also enable a user to input the test data set into the selected pre-trained model to generate an output indicative of a lithology classification. Additionally, in some examples, one or more commands may be generated, based on the lithology classification, to control a piece of wellbore equipment for a drilling operation.

In some aspects, a machine-learning model can be automatically selected for classifying the lithology of geological data, according to one or more of the following examples. As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory memory device comprising instructions that are executable by the processor to cause the processor to perform operations comprising: receiving geological or geophysical data collected for hydrocarbon exploration from a plurality of subterranean formations; generating, using the geological or geophysical data, a plurality of training data sets used to train machine-learning models, each training data set of the plurality of training data sets including a portion of the geological or geophysical data and one or more training classes, each training class being defined by a probability distribution and representing a classification of the portion of the geological or geophysical data; receiving a test data set including geological or geophysical data of a subterranean formation; selecting a training data set from the plurality of training data sets by comparing the test data set with the probability distribution of each training class of the one or more training classes of the training data set; determining a trained machine-learning model trained using the selected training data set; generating an output representing a recommendation to execute the trained machine-learning model to classify the test data set; and displaying, based on a result of executing the trained machine-learning model on the test data set, an interface presenting a classification of the test data set that is usable for hydrocarbon exploration.

Example 2 is the system of example(s) 1, wherein the operations further comprise: inputting the test data set into the trained machine-learning model associated with the selected training data set; generating an additional output, using the trained machine-learning model, the additional output predicting a characteristic of the subterranean formation; and generating, based on the additional output, a plan for drilling a wellbore for hydrocarbon exploration.

Example 3 is the system of example(s) 1-2, wherein the operation of selecting further comprises: determining, for each data point of a plurality of data points of the test data set, a distance between the data point and the probability distribution of each training class of the one or more training classes; and identifying the training class associated with a smallest distance between the data point and the probability distribution of the training class as compared to distances of remaining data points of the plurality of data points of the test data set.

Example 4 is the system of example(s) 1-3, wherein the operation of determining the distance further comprises: determining a Mahalanobis distance.

Example 5 is the system of example(s) 1-4, wherein the operation of selecting further comprises: determining a similarity metric representing a similarity between a data point of the test data set and the probability distribution of a training class of the one or more training classes of a training data set; and selecting, based on the determined similarity metric, the trained machine-learning model for classifying the test data set.

Example 6 is the system of example(s) 1-5, wherein the operation of generating the plurality of training data sets further comprises: defining each training class of the one or more training classes of a training data set by labeling a subset of the training data set with the classification, wherein the classification is a lithology.

Example 7 is the system of example(s) 1-6, wherein the operations further comprise: generating a chi-squared distribution of a distance between a data point of the test data set and the probability distribution of each training class; and selecting the training data set from the plurality of training data sets based on the chi-squared distribution.

Example 8 is a computer-implemented method comprising: receiving geological or geophysical data collected for hydrocarbon exploration from a plurality of subterranean formations; generating, using the geological or geophysical data, a plurality of training data sets used to train machine-learning models, each training data set of the plurality of training data sets including a portion of the geological or geophysical data and one or more training classes, each training class being defined by a probability distribution and representing a classification of the portion of the geological or geophysical data; receiving a test data set including geological or geophysical data of a subterranean formation; selecting a training data set from the plurality of training data sets by comparing the test data set with the probability distribution of each training class of the one or more training classes of the training data set; determining a trained machine-learning model trained using the selected training data set; generating an output representing a recommendation to execute the trained machine-learning model to classify the test data set; and displaying, based on a result of executing the trained machine-learning model on the test data set, an interface presenting a classification of the test data set that is usable for hydrocarbon exploration.

Example 9 is the computer-implemented method of example(s) 8, further comprising: inputting the test data set into the trained machine-learning model associated with the selected training data set; generating an additional output, using the trained machine-learning model, the additional output predicting a characteristic of the subterranean formation; and generating, based on the additional output, a plan for drilling a wellbore for hydrocarbon exploration.

Example 10 is the computer-implemented method of example(s) 8-9, wherein the selecting further comprises: determining, for each data point of a plurality of data points of the test data set, a distance between the data point and the probability distribution of each training class of the one or more training classes; and identifying the training class associated with a smallest distance between the data point and the probability distribution of the training class as compared to distances of remaining data points of the plurality of data points of the test data set.

Example 11 is the computer-implemented method of example(s) 8-10, wherein determining the distance further comprises: determining a Mahalanobis distance.

Example 12 is the computer-implemented method of example(s) 8-11, wherein the selecting further comprises: determining a similarity metric representing a similarity between a data point of the test data set and the probability distribution of a training class of the one or more training classes of a training data set; and selecting, based on the determined similarity metric, the trained machine-learning model for classifying the test data set.

Example 13 is the computer-implemented method of example(s) 8-12, further comprising: defining each training class of the one or more training classes of a training data set by labeling a subset of the training data set with the classification, wherein the classification is a lithology.

Example 14 is the computer-implemented method of example(s) 8-13, wherein the operations further comprise: generating a chi-squared distribution of a distance between a data point of the test data set and the probability distribution of each training class; and selecting the training data set from the plurality of training data sets based on the chi-squared distribution.

Example 15 is a computer-program product tangibly embodied in a non-transitory machine-readable storage medium, including instructions configured to cause a processing apparatus to perform operations including: receiving geological or geophysical data collected for hydrocarbon exploration from a plurality of subterranean formations; generating, using the geological or geophysical data, a plurality of training data sets used to train machine-learning models, each training data set of the plurality of training data sets including a portion of the geological or geophysical data and one or more training classes, each training class being defined by a probability distribution and representing a classification of the portion of the geological or geophysical data; receiving a test data set including geological or geophysical data of a subterranean formation; selecting a training data set from the plurality of training data sets by comparing the test data set with the probability distribution of each training class of the one or more training classes of the training data set; determining a trained machine-learning model trained using the selected training data set; generating an output representing a recommendation to execute the trained machine-learning model to classify the test data set; and displaying, based on a result of executing the trained machine-learning model on the test data set, an interface presenting a classification of the test data set that is usable for hydrocarbon exploration.

Example 16 is the non-transitory machine-readable storage medium of example(s) 15, wherein the operations further comprise: inputting the test data set into the trained machine-learning model associated with the selected training data set; generating an additional output, using the trained machine-learning model, the additional output predicting a characteristic of the subterranean formation; and generating, based on the additional output, a plan for drilling a wellbore for hydrocarbon exploration.

Example 17 is the non-transitory machine-readable storage medium of example(s) 15-16, wherein the operation of selecting further comprises: determining, for each data point of a plurality of data points of the test data set, a distance between the data point and the probability distribution of each training class of the one or more training classes; and identifying the training class associated with a smallest distance between the data point and the probability distribution of the training class as compared to distances of remaining data points of the plurality of data points of the test data set.

Example 18 is the non-transitory machine-readable storage medium of example(s) 15-17, wherein the operation of determining the distance further comprises: determining a Mahalanobis distance.

Example 19 is the non-transitory machine-readable storage medium of example(s) 15-18, wherein the operation of selecting further comprises: determining a similarity metric representing a similarity between a data point of the test data set and the probability distribution of a training class of the one or more training classes of a training data set; and selecting, based on the determined similarity metric, the trained machine-learning model for classifying the test data set.

Example 20 is the non-transitory machine-readable storage medium of example(s) 15-19, wherein the operation of generating further comprises: defining each training class of the one or more training classes of a training data set by labeling a subset of the training data set with the classification, wherein the classification is a lithology.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processor; and
a non-transitory memory device comprising instructions that are executable by the processor to cause the processor to perform operations comprising:
receiving geological or geophysical data collected for hydrocarbon exploration from a plurality of subterranean formations;
generating, using the geological or geophysical data, a plurality of training data sets used to train machine-learning models, each training data set of the plurality of training data sets including a portion of the geological or geophysical data and one or more training classes, each training class being defined by a probability distribution and representing a classification of the portion of the geological or geophysical data;
receiving a test data set including geological or geophysical data of a subterranean formation;
selecting a training data set from the plurality of training data sets by comparing the test data set with the probability distribution of each training class of the one or more training classes of the training data set;
determining a trained machine-learning model trained using the selected training data set;
generating an output representing a recommendation to execute the trained machine-learning model to classify the test data set; and
displaying, based on a result of executing the trained machine-learning model on the test data set, an interface presenting a classification of the test data set that is usable for hydrocarbon exploration.

2. The system of claim 1, wherein the operations further comprise:
inputting the test data set into the trained machine-learning model associated with the selected training data set;
generating an additional output, using the trained machine-learning model, the additional output predicting a characteristic of the subterranean formation; and
generating, based on the additional output, a plan for drilling a wellbore for hydrocarbon exploration.

3. The system of claim 1, wherein the operation of selecting further comprises:
determining, for each data point of a plurality of data points of the test data set, a distance between the data point and the probability distribution of each training class of the one or more training classes; and
identifying the training class associated with a smallest distance between the data point and the probability distribution of the training class as compared to distances of remaining data points of the plurality of data points of the test data set.

4. The system of claim 3, wherein the operation of determining the distance further comprises:
determining a Mahalanobis distance.

5. The system of claim 1, wherein the operation of selecting further comprises:
determining a similarity metric representing a similarity between a data point of the test data set and the probability distribution of a training class of the one or more training classes of a training data set; and
selecting, based on the determined similarity metric, the trained machine-learning model for classifying the test data set.

6. The system of claim 1, wherein the operation of generating the plurality of training data sets further comprises:
defining each training class of the one or more training classes of a training data set by labeling a subset of the training data set with the classification, wherein the classification is a lithology.

7. The system of claim 1, wherein the operations further comprise:
generating a chi-squared distribution of a distance between a data point of the test data set and the probability distribution of each training class; and selecting the training data set from the plurality of training data sets based on the chi-squared distribution.

8. A computer-implemented method comprising:
receiving geological or geophysical data collected for hydrocarbon exploration from a plurality of subterranean formations;
generating, using the geological or geophysical data, a plurality of training data sets, each training data set of the plurality of training data sets including a portion of the geological or geophysical data and one or more training classes, each training class being defined by a probability distribution and representing a classification of the portion of the geological or geophysical data;
training a plurality of machine-learning models based on the plurality of training data sets, each machine-learning model of the plurality of machine-learning models being trained using a respective training data set of the plurality of training data sets; and
subsequent to training the plurality of machine-learning models:
receiving a test data set including geological or geophysical data of a subterranean formation;
selecting a training data set from the plurality of training data sets, by comparing the test data set with at least one respective probability distribution associated with each respective training data set of the plurality of training data sets;
selecting, from among the plurality of machine-learning models, a trained machine-learning model that was trained using the selected training data set;
generating an output representing a recommendation to execute the trained machine-learning model to classify the test data set; and
displaying, based on a result of executing the trained machine-learning model on the test data set, an interface presenting a classification of the test data set that is usable for hydrocarbon exploration.

9. The computer-implemented method of claim 8, further comprising:
inputting the test data set into the trained machine-learning model associated with the selected training data set;
generating an additional output, using the trained machine-learning model, the additional output predicting a characteristic of the subterranean formation; and
generating, based on the additional output, a plan for drilling a wellbore for hydrocarbon exploration.

10. The computer-implemented method of claim 8, wherein the selecting further comprises:
determining, for each data point of a plurality of data points of the test data set, a distance between the data point and the probability distribution of each training class of the one or more training classes; and
identifying the training class associated with a smallest distance between the data point and the probability distribution of the training class as compared to distances of remaining data points of the plurality of data points of the test data set.

11. The computer-implemented method of claim 10, wherein determining the distance further comprises:
determining a Mahalanobis distance.

12. The computer-implemented method of claim 8, wherein the selecting further comprises:
determining a similarity metric representing a similarity between a data point of the test data set and the probability distribution of a training class of the one or more training classes of a training data set; and
selecting, based on the determined similarity metric, the trained machine-learning model for classifying the test data set.

13. The computer-implemented method of claim 8, further comprising:
defining each training class of the one or more training classes of a training data set by labeling a subset of the training data set with the classification, wherein the classification is a lithology.

14. The computer-implemented method of claim 8, further comprising:
generating a chi-squared distribution of a distance between a data point of the test data set and the probability distribution of each training class; and
selecting the training data set from the plurality of training data sets based on the chi-squared distribution.

15. A computer-program product tangibly embodied in a non-transitory machine-readable storage medium, including instructions configured to cause a processing apparatus to perform operations including:
receiving geological or geophysical data collected for hydrocarbon exploration from a plurality of subterranean formations;
generating, using the geological or geophysical data, a plurality of training data sets, each training data set of the plurality of training data sets including a portion of the geological or geophysical data and one or more training classes, each training class being defined by a probability distribution and representing a classification of the portion of the geological or geophysical data;
training a plurality of machine-learning models based on the plurality of training data sets, each machine-learning model of the plurality of machine-learning models being trained using a respective training data set of the plurality of training data sets; and
subsequent to training the plurality of machine-learning models:
receiving a test data set including geological or geophysical data of a subterranean formation;
selecting a training data set from the plurality of training data sets, by comparing the test data set with at least one respective probability distribution associated with each respective training data set of the plurality of training data sets;
selecting, from among the plurality of machine-learning models, a trained machine-learning model that was trained using the selected training data set;
generating an output representing a recommendation to execute the trained machine-learning model to classify the test data set; and
displaying, based on a result of executing the trained machine-learning model on the test data set, an interface presenting a classification of the test data set that is usable for hydrocarbon exploration.

16. The non-transitory machine-readable storage medium of claim 15, wherein the operations further comprise:
inputting the test data set into the trained machine-learning model associated with the selected training data set;
generating an additional output, using the trained machine-learning model, the additional output predicting a characteristic of the subterranean formation; and
generating, based on the additional output, a plan for drilling a wellbore for hydrocarbon exploration.

17. The non-transitory machine-readable storage medium of claim 15, wherein the operation of selecting further comprises:
- determining, for each data point of a plurality of data points of the test data set, a distance between the data point and the probability distribution of each training class of the one or more training classes; and
- identifying the training class associated with a smallest distance between the data point and the probability distribution of the training class as compared to distances of remaining data points of the plurality of data points of the test data set.

18. The non-transitory machine-readable storage medium of claim 17, wherein the operation of determining the distance further comprises:
- determining a Mahalanobis distance.

19. The non-transitory machine-readable storage medium of claim 15, wherein the operation of selecting further comprises:
- determining a similarity metric representing a similarity between a data point of the test data set and the probability distribution of a training class of the one or more training classes of a training data set; and
- selecting, based on the determined similarity metric, the trained machine-learning model for classifying the test data set.

20. The non-transitory machine-readable storage medium of claim 15, wherein the operation of generating further comprises:
- defining each training class of the one or more training classes of a training data set by labeling a subset of the training data set with the classification, wherein the classification is a lithology.

* * * * *